May 26, 1925.
P. A. MEEHAN
CAR WHEEL MOUNTING
Filed Sept. 23, 1924
1,539,264
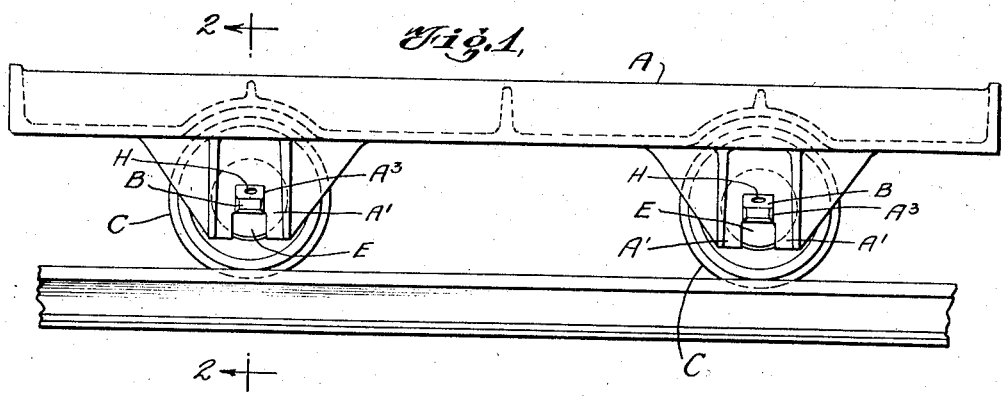
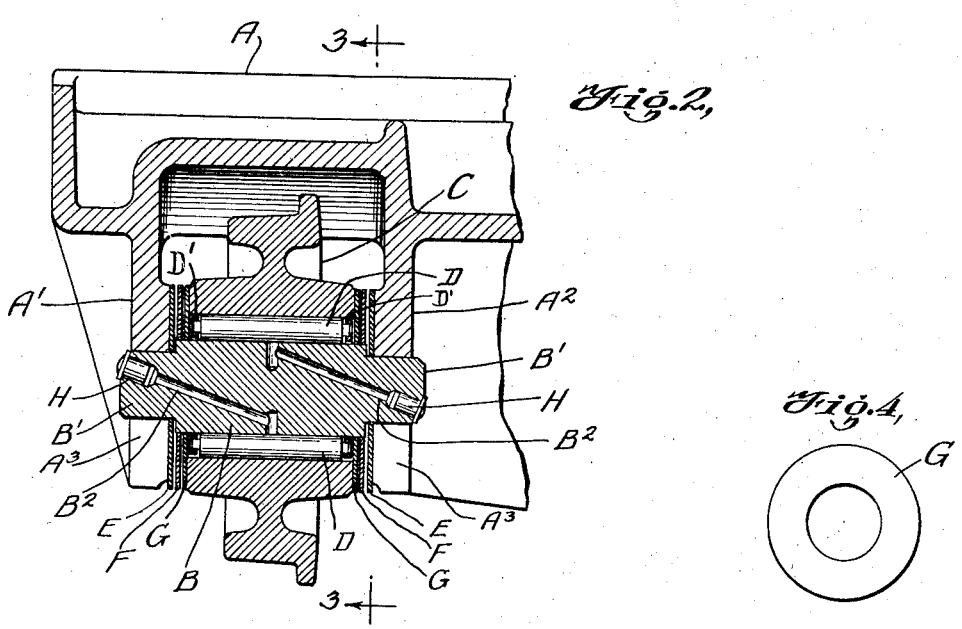
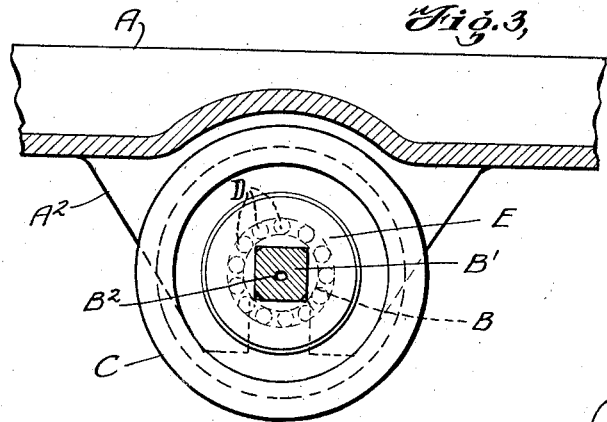
INVENTOR
Paul A. Meehan
BY John E. Hubbell
ATTORNEY Patented May 26, 1925.

1,539,264

UNITED STATES PATENT OFFICE.

PAUL A. MEEHAN, OF CLEVELAND, OHIO, ASSIGNOR TO AMERICAN DRESSLER TUNNEL KILNS, INC., A CORPORATION OF NEW YORK.

CAR-WHEEL MOUNTING.

Application filed September 23, 1924. Serial No. 739,375.

*To all whom it may concern:*

Be it known that I, PAUL A. MEEHAN, a citizen of the United States, and resident of Cleveland, in the county of Cuyahoga and State of Ohio, have invented certain new and useful Improvements in Car-Wheel Mountings, of which the following is a specification.

My present invention comprises improvements in car wheel mountings especially devised and adapted for use in tunnel kiln cars, and the general object of the invention is to provide a simple and effective construction in which the injurious effects of wear, under the severe conditions of use to which such cars are subjected are reduced to a minimum.

The various features of novelty which characterize my invention are pointed out with particularity in the claims annexed to and forming a part of this specification; but for a better understanding of the invention, however, and its advantages, reference should be had to the accompanying drawings and descriptive matter in which I have illustrated and described a preferred embodiment.

Of the drawings:

Fig. 1 is a side elevation of a kiln car frame and its supporting wheels;

Fig. 2 is a partial section on the line 2—2 of Fig. 1;

Fig. 3 is a partial section on the line 3—3 of Fig. 2; and

Fig. 4 is an elevation of one of the washers employed.

In the drawings, A represents the frame of a tunnel kiln car, which ordinarily, and as shown, is a one-piece casting of suitable metal as semi-steel, and is supported adjacent each corner by a corresponding wheel C. The mounting for each wheel B comprises a yoke formed by spaced apart depending integral flange portions A' and A² of the car frame A. The flanges A' and A² of each yoke are formed with slots A³ open at their lower ends to provide seats for the reduced ends B' of the corresponding car wheel axle B, of which there is one for each wheel C. The reduced end portions B' of the car wheel axles are preferably square or rectangular in cross section and in any event have flat sides which fit snugly against the sides of the slots A³ in which they are received so that the axles are held against rotation. The top edge of each slot A³ forms a seat for the upper edge of the corresponding reduced axle end B'. The body of each car axle is cylindrical, and, as shown, a roller bearing comprising rollers D with reduced ends journaled in guide rings D' is interposed between each axle and the corresponding wheel C. In so far as above described, the car wheel mounting illustrated is of the type disclosed in my prior Patent No. 1,328,479, granted January 20, 1920.

The tunnel kiln car structure of my prior patent has gone into extensive and successful use. It has been found, however, that under the severe conditions of use to which tunnel kiln cars are subjected the wheels wear away the inner faces of the yoke flanges A' and A² to an extent which occasionally makes it necessary to replace an entire metallic car frame part A, when, except for the wearing away and weakening of the flanges A' and A², the frame is practically as good as new. To obviate this defect, I have devised the improvement now to be described.

In accordance with the present invention, I make the cylindrical body of each car axle sufficiently shorter than the distance between the inner sides of the flanges A' and A² in which the axle is mounted, to receive two wear plates E, one mounted on each reduced end portion of the axle and each forming a removable facing plate for the inner side of the corresponding flange A' or A², so that the wear plates take the axial thrust and wear of the corresponding wheel C and its roller bearing. Advantageously, and as shown, each wear plate E is in the form of a disk with an opening shaped to snugly receive the corresponding reduced axle end B'. Advantageously, and as shown, the axial length of the hub of each wheel C is sufficiently less than the length of the cylindrical body portion of the corresponding axle B to accommodate one or more washers surrounding the body portion of the axle and interposed between the wheel hub and bearing and each wear plate E. As shown, there are two such washers, F and G, at each side of the wheel. When two washers, F and G, are thus used at each side of the wheel, the washer F is advantageously made of a suitable bearing material, such as bronze, while the washer G and wear plate E, and particularly the latter, are made of steel.

In considering the practical merit of my improvement and the advantages attained with it, account should be taken of the conditions of use to which such cars are subjected. In the operation of an ordinary tunnel kiln the temperature in the kiln chamber proper is always high: a maximum kiln chamber temperature of 2,000° F. is common, and in some kilns the maximum kiln chamber temperature is hundreds of degrees above 2,000° F. While the car wheels and the metallic frame A are not directly exposed to the maximum kiln chamber temperature, the car body of refractory material (not shown) mounted on the top of the car frame A is so exposed and the wheel mountings are heated to temperatures but little below that at which the strength of metallic parts is seriously reduced. The temperature reached is high enough to make the lubricating provisions, such as are formed by the channels $B^2$, and the lubricating devices H mounted in the outer ends of those channels, only moderately effective. The character of the lubrication and the high temperatures are conducive, of course, to very rapid wear. From cost considerations, as well as the conditions of use, it is practically essential that the car wheel mountings should be simple and inexpensive, and at the same time strong and durable. These results are attained with the present construction. Inasmuch as the wear plates E are held snugly against and do not move with respect to the flanges $A'$ and $A^2$, which they face, those flanges are wholly protected against the injurious wear to which they have heretofore been subjected. The provision of the bronze washer F between each steel wear plate E and the corresponding washer G reduces the friction and wear of the wear plates and washers. With the improved construction it is a comparatively simple and inexpensive matter to replace one or more of the parts E, F, and G when wear makes this desirable. The avoidance of wear of the flange portions $A'$ and $A^2$ and the comparative ease with which the parts E, F, and G may be replaced obviously facilitates the maintenance of the proper relative spacing of the four wheels C of each car necessary for proper track engagement.

In operation, the wear on the body of each axle is confined almost entirely to the under side of the latter. In consequence, a new wearing surface may be presented, and the effective life of the axle practically doubled by turning the axle upside down after the wear on the original under side of the axle has progressed to the point at which such reversal becomes necessary. To facilitate the supply of lubricating material to the bearing surfaces where it is most needed, namely: at the under side of each axle, I form in each axle two lubricating channels $B^2$ which extend into the axle from opposite ends and open at the cylindrical surface of the latter, one at the top and the other at the bottom of the axle. Lubricating material may be supplied to the outer end of each channel $B^2$ through a corresponding lubricating device H, which may be of known form and is mounted in the outer end of the channel. The channels $B^2$ are inclined so that with the axle in place in the slots $A^3$, the channel $B^2$ opening at the then under side of the axle leads to the upper side of the end of the axle at which the corresponding device H is located and the arrangement permits said device to be located at the outer side of the car. This facilitates the recharging with lubricating material of the device H discharging lubricating material at the bottom of the axle. With this arrangement of the lubricating channels, when the axle is turned upside down to present a new bearing surface such reversal should be effected by turning the axle end for end to bring the corresponding lubricating device H to the outer side of the car.

Having now described my invention, what I claim as new and desire to secure by Letters Patent, is:

1. In a car of the type specified comprising a plurality of supporting wheels, a separate axle for each of said wheels having reduced end portions with flattened sides and a metallic car frame mounted on said wheels and formed with depending flanges, one at each side of each wheel and each having a seat in which the corresponding reduced wheel axle end is snugly received and held against rotation, the improvement which consists in a wear plate for each end of each axle formed with an aperture snugly receiving the reduced end portion of the axle and held by the latter against rotation and forming a removable facing for the side of the corresponding flange adjacent the corresponding wheel.

2. In a car of the type specified comprising a plurality of supporting wheels, a separate axle for each of said wheels having a cylindrical body on which the wheel is journalled, and reduced end portions with flattened sides and a metallic car frame mounted on said wheels and formed with depending flanges, one at each side of each wheel and each having a seat in which the corresponding reduced wheel axle end is snugly received and held against rotation, the improvement which consists in a wear plate for each end of each axle formed with an aperture snugly receiving the reduced end portion of the axle and held by the latter against rotation and forming a removable facing for the side of the corresponding flange adjacent the corresponding wheel, and washers mounted on the ends of the cylindrical body of each axle between the wheel and the wear plates.

3. In a car of the type specified comprising a plurality of supporting wheels, a separate axle for each of said wheels having a cylindrical body on which the wheel is journalled, and reduced end portions with flattened sides and a metallic car frame mounted on said wheels and formed with depending flanges, one at each side of each wheel and each having a seat in which the corresponding reduced wheel axle end is snugly received and held against rotation, the improvement which consists in a wear plate for each end of each axle formed with an aperture snugly receiving the reduced end portion of the axle and held by the latter against rotation and forming a removable facing for the side of the corresponding flange adjacent the corresponding wheel, and two washers mounted on each end of the cylindrical body of each axle, the washer adjacent each wear plate being of different material from the wear plate and the adjacent wear plate.

4. In a car of the type described, the combination with a plurality of supporting wheels and a separate axle for each of said wheels, of a metallic car frame mounted on said wheels and formed with depending flanges, one at each side of each wheel and each having a seat in which the corresponding wheel axle end may be received and held against rotation with either of two opposite sides uppermost and with either axle end at the outer side of the car, the improvement which consists in lubricating provisions comprising a pair of lubricating channels in each axle, one leading into the axle from each one opening at its inner end at one, and the other to the second of said sides said channels being each inclined in the same direction to the axis of the axle whereby by turning the axle end for end and upside down in its seats the lubricating channel leading from the end of the axle at the outer side of the car may extend downwardly to the then under side of the axle.

Signed at Cleveland, in the county of Cuyahoga, and State of Ohio, this nineteenth day of September, A. D. 1924.

PAUL A. MEEHAN